(12) United States Patent
Overend et al.

(10) Patent No.: US 7,818,178 B2
(45) Date of Patent: Oct. 19, 2010

(54) METHOD AND APPARATUS FOR PROVIDING NETWORK SUPPORT FOR VOICE-ACTIVATED MOBILE WEB BROWSING FOR AUDIO DATA STREAMS

(75) Inventors: Kevin J. Overend, Elmhurst, IL (US); David S. Benco, Winfield, IL (US); Baoling S. Sheen, Naperville, IL (US); Sandra Lynn True, St. Charles, IL (US); Kenneth J. Voight, Sugar Grove, IL (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 1005 days.

(21) Appl. No.: 10/864,740

(22) Filed: Jun. 9, 2004

(65) Prior Publication Data
US 2005/0278179 A1 Dec. 15, 2005

(51) Int. Cl.
*G10L 21/00* (2006.01)
(52) U.S. Cl. ............... 704/270.1; 704/270; 704/7
(58) Field of Classification Search ............ 704/231, 704/270, 275, 270.1, 258, 243, 246, 7, 3, 704/251, 257; 707/6, 10, 231; 709/203
See application file for complete search history.

(56) References Cited

U.S. PATENT DOCUMENTS

| | | | |
|---|---|---|---|
| 6,031,836 A | 2/2000 | Haserodt | |
| 6,038,296 A | 3/2000 | Brunson et al. | |
| 6,070,185 A | 5/2000 | Anupam et al. | |
| 6,311,182 B1 | 10/2001 | Colbath et al. | |
| 6,321,251 B1 * | 11/2001 | Deisinger et al. | 709/203 |
| 6,335,928 B1 | 1/2002 | Herrmann et al. | |
| 6,421,714 B1 | 7/2002 | Rai et al. | |
| 6,430,175 B1 | 8/2002 | Echols et al. | |
| 6,434,520 B1 * | 8/2002 | Kanevsky et al. | 704/243 |
| 6,604,075 B1 | 8/2003 | Brown et al. | |
| 6,618,039 B1 | 9/2003 | Grant et al. | |
| 6,618,726 B1 * | 9/2003 | Colbath et al. | 707/6 |
| 6,654,367 B1 | 11/2003 | Kaufman | |
| 7,076,431 B2 * | 7/2006 | Kurganov et al. | 704/275 |
| 7,206,745 B2 * | 4/2007 | Sarukkai et al. | 704/270.1 |
| 2001/0034603 A1 | 10/2001 | Thrift et al. | |
| 2002/0164000 A1 | 11/2002 | Cohen et al. | |
| 2003/0182622 A1 | 9/2003 | Sibal et al. | |

* cited by examiner

*Primary Examiner*—Huyen X. Vo
(74) *Attorney, Agent, or Firm*—Fay Sharpe LLP

(57) ABSTRACT

This invention relates to a method and apparatus for providing network support for voice-activated mobile web browsing for audio data streams. More particularly, the presently described embodiments are directed to enhancing an existing wireless network to provide hands-free web browsing to retrieve audio data. This allows wireless customers to make verbal web requests, (e.g., not requiring the use of hands), thus making it possible to request web audio programs while engaging in other activities, such as safely driving their vehicles.

24 Claims, 3 Drawing Sheets

METHOD AND APPARATUS FOR PROVIDING NETWORK SUPPORT FOR VOICE-ACTIVATED MOBILE WEB BROWSING FOR AUDIO DATA STREAMS

BACKGROUND OF THE INVENTION

This invention relates to a method and apparatus for providing network support for voice-activated mobile web browsing for audio data streams. More particularly, the presently described embodiments are directed to enhancing an existing wireless network to provide hands-free web browsing to retrieve audio data. This system allows wireless customers to make verbal web requests (e.g., not requiring the use of hands), thus making it possible to request web-based audio programs while engaging in other activities, such as safely driving their vehicles.

While the invention is particularly directed to the art of voice-activated mobile web browsing for audio data streams, and will be thus described with specific reference thereto, it will be appreciated that the invention may have usefulness in other like fields and applications.

By way of background, voice-activated web browsers are known. Moreover, browsing for audio data streams is known. However, wireless network support for such systems is lacking.

The present invention contemplates a new and improved system for providing network support for voice-activated mobile web browsing for audio data streams that resolves the above-referenced difficulties and others.

SUMMARY OF THE INVENTION

A method and apparatus for providing network support for voice-activated mobile web browsing for audio data streams are provided.

In one aspect of the invention, the method comprises receiving an audio request comprising input voice data for voice-activated web browsing from a subscriber, validating the audio request, converting the input voice data to input text data, determining if the input text data corresponds to a pre-defined web site, connecting the subscriber to the pre-defined web site if the input text data corresponds thereto, receiving first audio data streams from the pre-defined web site if the input data corresponds thereto, providing the first audio data streams to the subscriber, providing the input text data to an audio search engine if the input text data does not correspond to the pre-defined web site, configuring a search request by the search engine based on the input text data, conducting a search for second audio data streams based on the search request, and providing results of the search to the subscriber.

In another aspect of the invention, determining if the input text corresponds to a pre-defined web site comprises accessing a database.

In another aspect of the invention, the conducting of the search for second audio data streams comprises conducting the search based on file extensions.

In another aspect of the invention, providing the results of the search comprises providing the second audio data streams to the subscriber.

In another aspect of the invention, providing the results of the search comprises providing a listing of located web sites to the subscriber.

In another aspect of the invention, the listing is an audio listing.

In another aspect of the invention, the method further comprises—in the absence of the audio request—retrieving the first audio data streams based upon predetermined criteria and providing the first audio data streams to the subscriber.

In another aspect of the invention, a means for implementing the method are provided.

In another aspect of the invention, the apparatus comprises a switching module, an internet gateway, a speech recognition unit, a subscriber web database, a subscriber web interface, and an audio web search engine.

In another aspect of the invention, the apparatus comprises a subscriber web alert manager.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

The presently described embodiments provide network support for voice-activated web browsing for audio data streams. The system allows wireless customers or subscribers to make verbal web requests for audio streams. An advantage of this system is that it does not require the use of hands, making it possible to request web audio programs while, for example, safely driving a vehicle. Wireless service providers may wish to offer such value added services to utilize existing wireless voice and internet browsing capabilities.

As an example of an implementation of the present invention, presume a subscriber is a Chicago Bears fan, and is out of town during one of the Bears' football games. A service in accord with the present invention allows the subscriber to call a service provider voice and internet browsing request point (e.g., via an 800-number). Then, the subscriber states, "Audio for today's Chicago Bears football game." The wireless network service subsequently performs a number of functions including translating the statement (i.e., "Audio for today's Chicago Bears football game") to a search request, searching the internet for a match based on the request, and connecting the mobile subscriber to an audio feed for the Bears football game, if a match is found. Other similar examples of implementation may involve a request for a "Chicago traffic report" or a "Chicago weather report" while driving.

Another feature that may be realized by implementation of this invention is the option of pre-designating a web site for a particular query request. For example, if the subscriber states "St. Charles Swim Team," the network will search a subscriber database to find a match and connect the subscriber to the audio streams available on, for example, www.stcswim.com.

Another feature that may be realized by implementation of this invention is the use of a reminder list to allow for the provision of audio data streams to a subscriber based upon predetermined criteria, in the absence of the audio request. In this regard, a reminder list may be stored and acted upon in such a way so as to allow a subscriber web alert manager to initiate a data session based on information stored in the reminder list.

Figure 1:
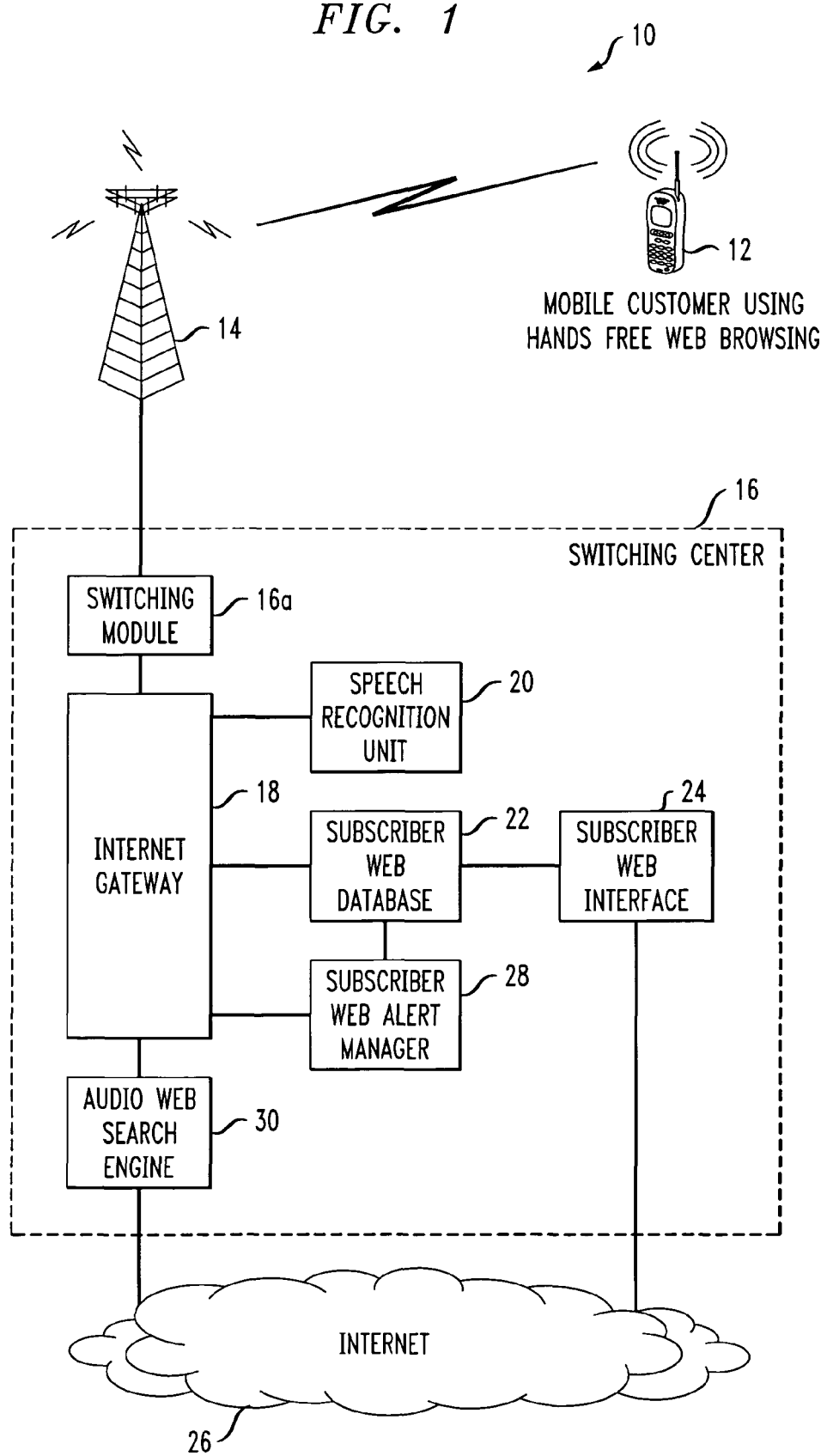
FIG. 1 is a block diagram illustrating a network according to the present invention.

Referring now to the drawings wherein the showings are for purposes of illustrating the preferred embodiments of the invention only and not for purposes of limiting same, FIG. 1 provides a view of an exemplary system according to the present invention. As shown, a network 10 is accessed by a mobile subscriber using a mobile device 12 through a base station 14. The base station 14 is in communication with a switching center 16, which may take the form of a mobile switching center (MSC) or other primary switching element of the network into which the invention is incorporated. The switching center 16 includes a switching module 16a, as well as an internet gateway 18 which has access to a speech recognition unit 20. The internet gateway 18 is also connected to a subscriber web database 22 which connects to a subscriber web interface 24. Of course, the subscriber web interface 24 provides access to the internet 26. A subscriber web alert manager 28 is also connected to the subscriber web database 22 and the internet gateway 18. Also shown in FIG. 1 is an audio web search engine 30.

It should be appreciated that—while the switching module 16a, internet gateway 18, speech recognition unit 20, subscriber web database 22, subscriber web interface 24, subscriber web alert manager 28, and audio web search engine 30 are shown as being part of the switching center 16—these elements may also be configured as separate network elements, or be housed on separate network elements, in communication with one another. These elements may take a variety of forms as a consequence. Appropriate software techniques and hardware implementations may be used. The software may be housed on a single element or distributed among all or some of those elements.

The switching center 16 may take the form of a mobile switching center (MSC). However, it will be understood that the embodiments described herein are not so limited. As noted above, the switching center 16 may take the form of any primary switching module available in a network—which, of course, may vary from network to network in a number of ways including the generation of technology that is implemented. The same is true for the base station 14—its form may vary and may be replaced with an alternative structure.

It should be further understood that the switching module 16a includes the functionality necessary for suitable switching to take place within the switching center 16. This functionality is well known in the art and is thus not described herein. However, it should be appreciated that the switching center 16 preferably includes the additional functionality of having the ability to identify a request for voice-activated browsing according to the present invention and pass that request on to the internet gateway 18. This could be accomplished through the use of a specific phone number to which a call is made from the mobile device 12 and/or a specific command that can be spoken, or a keystroke that can be entered, by the mobile subscriber into the mobile device 12.

The internet gateway 18 provides an interface from the switching module 16a to all of the various components that are required to provide the subject voice-activated web browsing functionality. For example, if a request for a certain audio program is received, the internet gateway 18 will send the input voice data to the speech recognition unit 20 to translate the input voice data to text data. The internet gateway 18 then sends the text data to audio search web engine 30 to find a desired web link or conducts a search of the subscriber web database 22, as described below.

In either case, the speech recognition unit 20 converts the speech web requests that are spoken by the mobile customer to text data. Speech to text conversion may be implemented in a variety of well known manners.

The subscriber web database 22 stores customer requests and preferences for keyword translation that can be correlated to a specific web site. An example of this functionality resides in a customer preference to equate a web site to find out about school closings with the keyword "school closings." So, the database may be configured in such a manner to have keywords act as indices and the corresponding web site data serve as an associative data field.

Another type of request or preference that can be stored in this database relates to scheduling future programs to be provided to the subscriber. For example, a customer may set a program reminder for a football game that will be played tomorrow. The subscriber alert manager 28 will use this data to provide the appropriate audio stream at the appropriate time.

The subscriber web interface 24 provides a secure interface for mobile customers, for example, to input customer specific data, such as that described in subscriber web database 22. This interface also acts to receive audio streams that are captured in response to a user request.

The subscriber alert manager 28 provides alerts to mobile customers about scheduled future audio programs when the time of the program happens. As noted above, the subscriber alert manager 28 accesses the subscriber web database to do so.

The audio search web engine 30 is customized to find audio files on the internet (e.g., real player, windows media, etc.). Searching for audio data streams on the internet is a well known process. For example, it can be accomplished by simply limiting the search to results that have particular file extensions that are unique to audio data.

Figure 2:
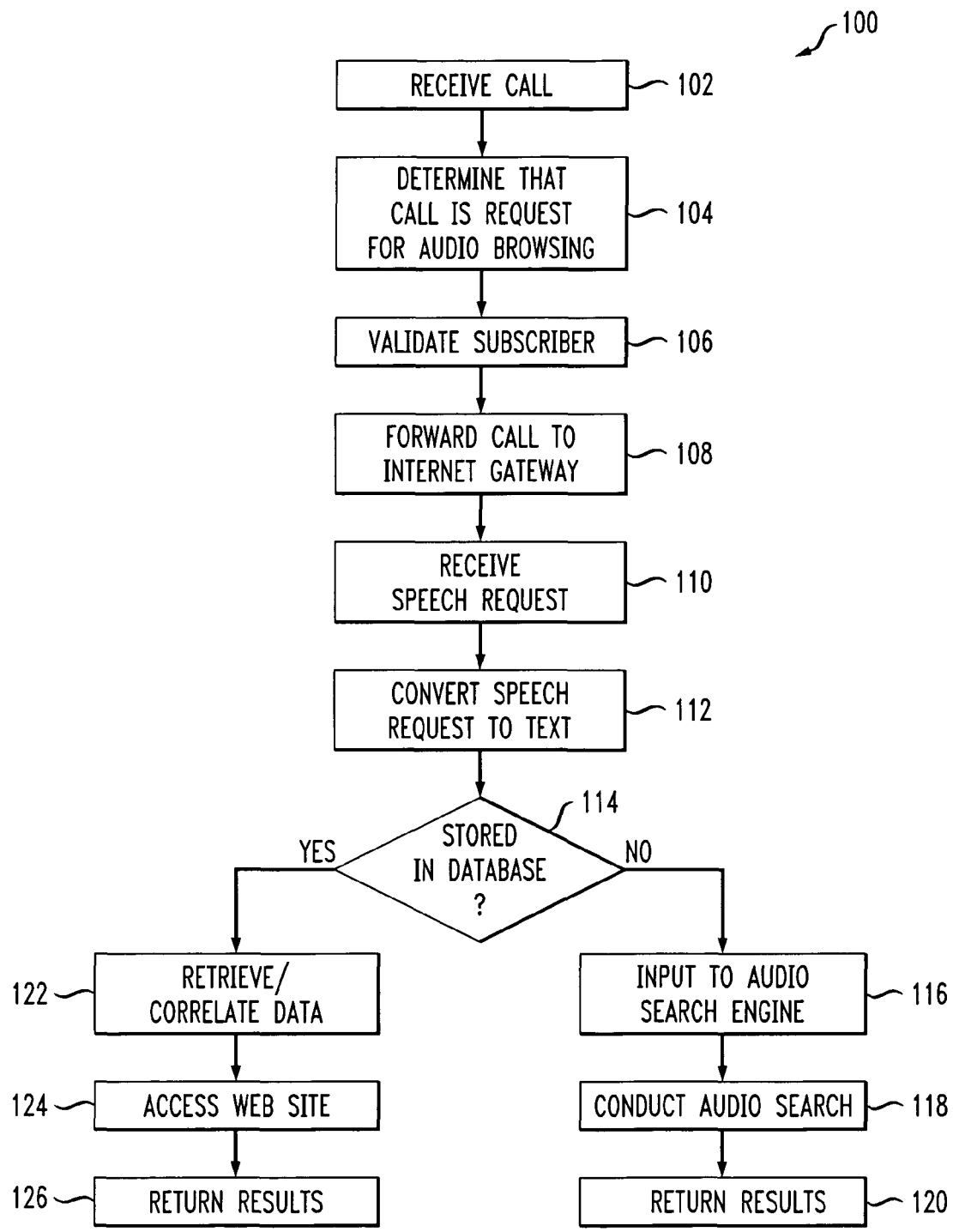
FIG. 2 is a flow chart illustrating a method according to the present invention; and, FIG. 3 is a flow chart illustrating a method according to the present invention.

With respect to operation of the system, an exemplary method according to the presently described embodiments is shown in FIG. 2. As illustrated, the method 100 is initiated upon the receipt of a call at the switching module 16a (at 102). The switching module 16a then determines if the call is an audio request according to the present invention (at 104). This can be accomplished by implementing a particular access number for the service. If not, of course, the call is processed in the normal course. If so, however, the audio request (or the subscriber who is operating the mobile device 12) is validated by the system (at 106). This is accomplished by accessing a subscriber database housed within, or simply in communication with, the switching center 16, as is well known in the art. The subscriber web database 22 may also serve this function, depending on the design of the network.

If the audio request is verified and the subscriber is validated, the audio request (e.g., the voice data) is forwarded to the internet gateway 18 (at 108). The voice data, or web query, is then received by the internet gateway (at 110). This received speech is converted to text data (at 112). The internet gateway 18 then determines if the converted speech (e.g., text data) corresponds to an entry in the subscriber web database 22 (at 114). A simple database search can be conducted by comparing the converted data to the database entries. If not, the text data is input to the audio web search engine (at 116). The audio web search engine 30 formulates a search query based on the text data and conducts an audio search on the internet (at 118). As noted above, searching for audio streams is a known process. Results of the search are returned to the mobile subscriber through the audio web search engine 30 (at 120). It should be appreciated that the search results may be provided in a variety of forms, such as an audio menu or the like, to the user. In some situations, the system may simply provide an audio stream directly to the mobile subscriber.

If it is determined that the text data corresponds to an entry stored in the subscriber web database 22 (at 114), then the appropriate data in the subscriber database 22 is retrieved and correlated to an appropriate, pre-defined web site (at 122). The determined web site is then accessed through the subscriber web interface 24 (at 124). The results are ultimately returned to the mobile user (at 126). It should be understood that returning the results to the user in this context could simply mean providing the requested audio data streams to the mobile subscriber. This process may also include, or be accompanied by, an audio menu to allow the mobile subscriber to exercise options regarding the audio data stream.

As noted above, the presently described embodiments also provide for the use of a technique for reminding and/or scheduling the mobile subscriber in connection with audio streams to which the mobile subscriber requests access. For example, the mobile subscriber may set a reminder and/or schedule a football broadcast to be played to the mobile subscriber on a particular day and time.

Figure 3:
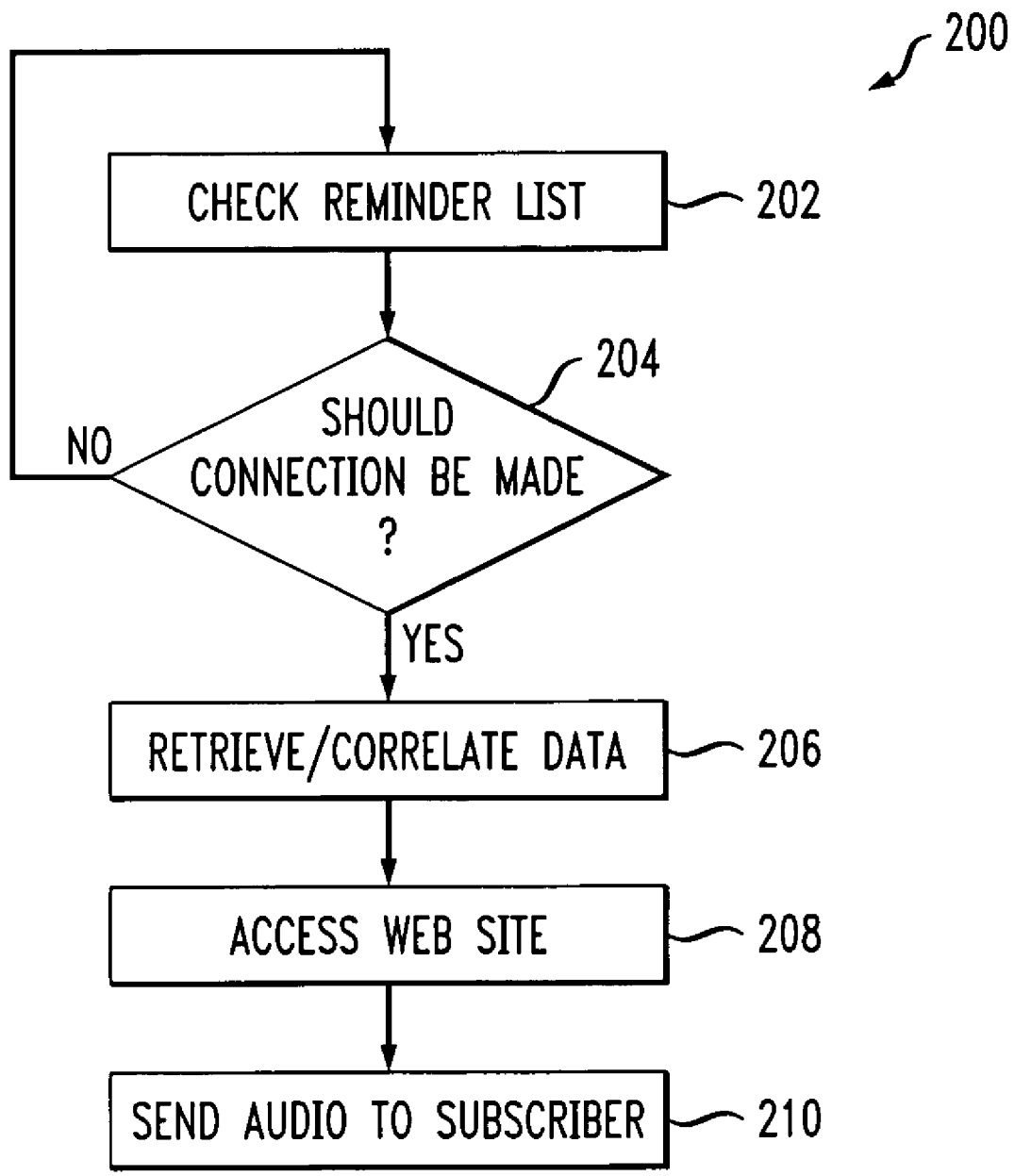

Referring now to FIG. 3, a method 200 describing the process for doing so is illustrated. As shown, the method 200 includes the function of checking the reminder list periodically to determine if a connection should be made (at 202 and 204). If there is no connection that should be made, the reminder list is simply checked again after a predetermined time expires. If, however, the system determines that a connection should be made, the data relating to the desired web site is retrieved and/or correlated using the subscriber web database 22 (at 206). The desired web site is then accessed through the subscriber web interface 24 (at 208). Once the connection is completed, the audio is simply sent to the subscriber (at 210). As with the other embodiments, it should understood that the audio results returned to the subscriber may simply be a connection to the audio stream, or it may also be accompanied by a menu such as an audio menu to provide the mobile subscriber with alternatives regarding listening to the audio, storing the audio, . . . etc.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for supporting voice-activated browsing for audio data streams in a wireless network, the method comprising:

receiving, at a switching module, an audio request comprising input voice data for voice-activated web browsing from a mobile device of a subscriber;

validating, at an Internet gateway, the audio request;

converting, by a speech recognition module, the input voice data to input text data;

determining, by the Internet gateway, if the input text data corresponds to a pre-defined web site;

connecting, at the Internet gateway, the mobile device of the subscriber to the pre-defined web site if the input text data corresponds thereto;

receiving, at a web interface, first audio data streams of a web-based audio program from the pre-defined web site if the input text data corresponds thereto;

providing, by the web interface, the first audio data streams of the web-based audio program to the mobile device of the subscriber;

providing, by the internet gateway, the input text data to an audio web search engine if the input text data does not correspond to the pre-defined web site;

configuring, by the audio web search engine, a search request based on the input text data;

conducting, by the audio web search engine, a search for second audio data streams of the web-based audio program based on the search request; and, providing, by the audio web search engine, results of the search to the mobile device of the subscriber.

2. The method as set forth in claim 1 wherein the determining comprises accessing a database.

3. The method as set forth in claim 1 wherein conducting the search comprises conducting the search based on file extensions.

4. The method as set forth in claim 1 wherein providing the results comprises providing the second audio data streams of the web-based audio program to the mobile device of the subscriber.

5. The method as set forth in claim 1 wherein providing the results comprises providing a listing of located web sites to the mobile device of the subscriber.

6. The method as set forth in claim 5 wherein the listing is an audio listing.

7. The method as set forth in claim 1 further comprising, in the absence of the audio request, retrieving the first audio data streams of the web-based audio program based upon predetermined criteria and providing the first audio data streams to the mobile device of the subscriber.

8. A system for supporting voice-activated browsing for audio data streams in a wireless network, the system comprising:

means for receiving an audio request comprising input voice data for voice-activated web browsing from a mobile device of a subscriber;

means for validating, by an internet gateway, the audio request;

means for converting the input voice data into input text data;

means for determining, by the internet gateway, if the input text data corresponds to a pre-defined web site;

means for connecting, by the internet gateway, the mobile device of the subscriber to the pre-defined web site if the input text data corresponds thereto;

means for receiving first audio data streams of a web-based audio program from the pre-defined web site if the input text data corresponds thereto;

means for providing the first audio data streams of the web-based audio program to the mobile device of the subscriber;

means for providing, by the internet gateway, the input text data to an audio search engine if the input text data does not correspond to the pre-defined web site;

means for configuring a search request based on the input text data;

means for conducting a search for second audio data streams of the web-based audio program streams based on the search request; and, means for providing results of the search to the mobile device of the subscriber.

9. The system as set forth in claim 8 wherein the means for determining comprises a database.

10. The system as set forth in claim 8 wherein the means for conducting the search comprises means for conducting the search based on file extensions.

11. The system as set forth in claim 8 wherein the means for providing the results comprises means for providing the second audio data streams of the web-based audio program to the mobile device of the subscriber.

12. The system as set forth in claim 8 wherein the means for providing the results comprises means for providing a listing of located web sites to the mobile device of the subscriber.

13. The system as set forth in claim 12 wherein the listing is an audio listing.

14. The system as set forth in claim 8 further comprising a means for retrieving the first audio data streams based upon predetermined criteria, in the absence of the audio request, and means for providing the first audio data streams of the web-based audio program to the mobile device of the subscriber.

15. A system for supporting voice-activated browsing for audio data streams in a wireless network, the system comprising:
    a switching module operative to receive an audio request comprising input voice data for voice-activated web browsing from a mobile device of a subscriber;
    a speech recognition unit operative to convert the input voice data to input text data;
    an internet gateway operative to validate the audio request, wherein the internet gateway is further operative to determine if the input text data corresponds to a pre-defined web site, wherein the internet gateway is further operative to connect the mobile device of the subscriber to the pre-defined web site if the input text data corresponds thereto, wherein the internet gateway is further operative to provide the input text data to an audio search engine if the input text data does not correspond to the pre-defined web site;
    a web interface operative to receive first audio data streams of the web-based audio program from the pre-defined web site if the input text data corresponds thereto; and,
    an audio web search engine operative to configure a search request based on the input text data and conduct a search for second audio data streams of the web-based audio program based on the search request.

16. The system as set forth in claim 15 wherein the internet gateway is further operative to provide the first audio data streams of the web-based audio program to the mobile device of the subscriber and provide the results of the search for second audio streams to the mobile device of the subscriber.

17. The system as set forth in claim 15 further comprising a database operative to store information relating to pre-defined web sites.

18. The system as set forth in claim 15 wherein the results comprise second audio data streams of the web-based audio program to be provided to the mobile device of the subscriber.

19. The system as set forth in claim 15 wherein the results comprise a listing of located web sites.

20. The system as set forth in claim 15 further comprising a subscriber web alert manager operative, in the absence of the audio request, to retrieve first audio data streams of the web-based audio program based upon predetermined criteria and provide the first audio data streams to the mobile device of the subscriber.

21. A method for supporting voice-activated browsing for audio data streams in a wireless network, the method comprising:
    validating, at an Internet gateway, an audio request received at a switching module, wherein the audio request comprises input voice data for voice-activated web browsing from a mobile device of a subscriber;
    determining, by the Internet gateway, if input text data corresponds to a pre-defined web site, wherein the input text data is based on the input voice data;
    connecting, at the Internet gateway, the mobile device of the subscriber to the pre-defined web site if the input text data corresponds thereto, wherein the pre-defined web site streams first audio data streams of a web-based audio program to the mobile subscriber; and
    providing, by the Internet gateway, the input text data to an audio web search engine if the input text data does not correspond to the pre-defined web site.

22. The method of claim 21, the method further comprises:
    configuring, by the audio web search engine, a search request by the search engine based on the input text data;
    conducting, by the audio web search engine, a search for second audio data streams of the web-based audio program based on the search request; and,
    providing by the audio web search engine, results of the search to the mobile device of the subscriber.

23. A system for supporting voice-activated browsing for audio data streams in a wireless network, the system comprising:
    an internet gateway operative to validate an audio request, wherein the audio request comprises input voice data for voice-activated web browsing, wherein the internet gateway is further operative to determine if input text data, based on the input voice data, corresponds to a pre-defined web site, wherein the internet gateway is further operative to connect the mobile device of the subscriber to the pre-defined web site if the input text data corresponds thereto, wherein the internet gateway is further operative to provide the input text data to an audio search engine if the input text data does not correspond to the pre-defined web site, wherein the pre-defined web site streams first audio data streams of the web-based audio program if the input text data corresponds thereto.

24. The system of claim 23, further comprising:
    an audio web search engine operative to configure a search request based on the input text data and conduct a search for second audio data streams of the web-based audio program based on the search request.

* * * * *